No. 739,255. PATENTED SEPT. 15, 1903.
E. F. BRADLEY & W. R. PIDGEON.
CLUTCH.
APPLICATION FILED MAR. 16, 1903.
NO MODEL. 2 SHEETS—SHEET 1.

Witnesses: Inventors:-
Gustave R Thompson Edward F. Bradley & Winter R. Pidgeon,
by
Mauro, Cameron Lewis,
Attys.

No. 739,255. PATENTED SEPT. 15, 1903.
E. F. BRADLEY & W. R. PIDGEON.
CLUTCH.
APPLICATION FILED MAR. 16, 1903.
NO MODEL. 2 SHEETS—SHEET 2.

No. 739,255. Patented September 15, 1903.

UNITED STATES PATENT OFFICE.

EDWARD FRANKLIN BRADLEY AND WINTER RANDELL PIDGEON, OF LONDON, ENGLAND, ASSIGNORS TO BERNARD FRANKLIN BRADLEY, OF NEW YORK, N. Y.

CLUTCH.

SPECIFICATION forming part of Letters Patent No. 739,255, dated September 15, 1903.

Application filed March 16, 1903. Serial No. 148,357. (No model.)

*To all whom it may concern:*

Be it known that we, EDWARD FRANKLIN BRADLEY, engineer, residing at "The Hive," Anson Road, Tufnell Park, London, and WINTER RANDELL PIDGEON, engineer, residing at 42 Porchester Square, London, England, subjects of the King of Great Britain and Ireland, have invented certain new and useful Improvements in Clutches More Especially Intended for Motor-Cars, of which the following is a specification.

Our invention relates to clutches of the class wherein there is carried on the driving part—on the fly-wheel of the motor when the clutch is used on motor-cars, for example—a set of thin rings, preferably of a hard material, such as steel, which rings alternate with another set of rings carried on the part to be driven, these sets of rings partly overlapping each other by reason of the inner diameter of one set being less than the outer diameter of the other set, the said rings when the clutch is in action being all pressed together by a spring or springs, but the rings of one set slipping freely between the rings of the other set when the pressure of the spring or springs is removed.

The object of our invention is to provide a clutch of this class which is very sensitive and is capable of transmitting considerable power and which can also be thrown into and out of action smoothly and with but little effort and in which the sets of rings are so mounted, arranged, and operated upon that no end thrust is transmitted to the driving or driven parts, while the parts which operate the clutch carry none of the driving strain.

We will describe our improved arrangements in clutches of this class with reference to the accompanying drawings, in which—

Figure 1:
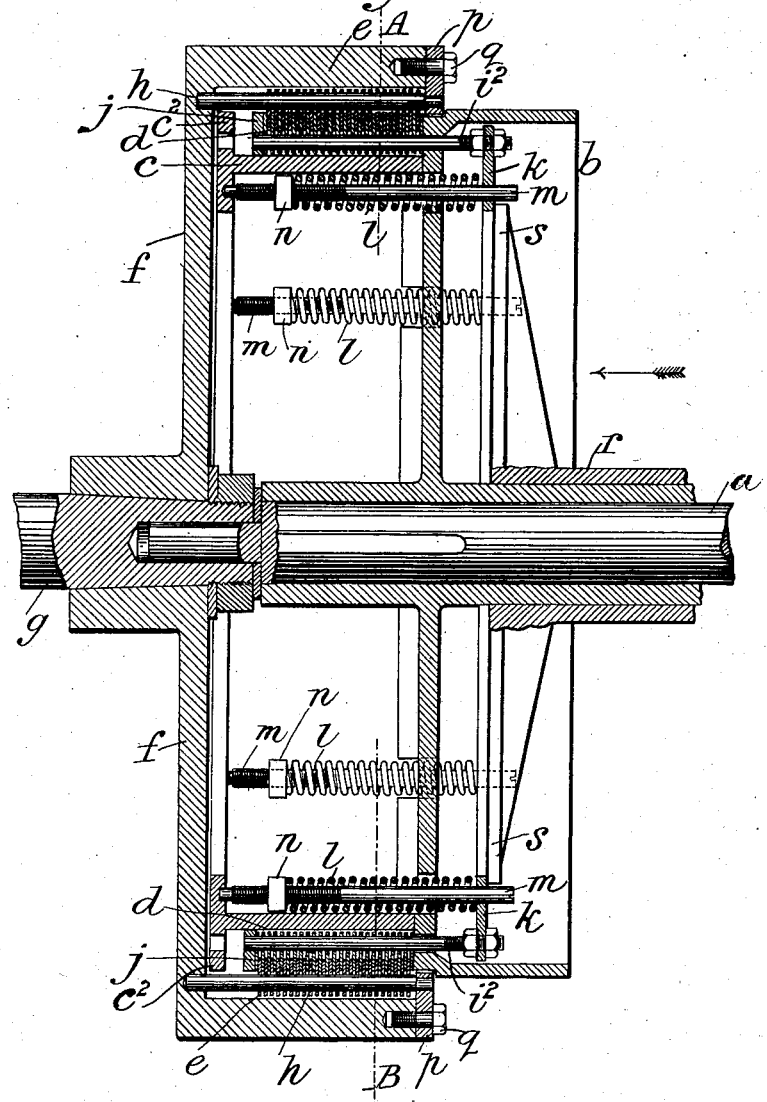
Figure 4:
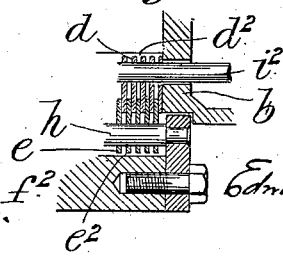
Figure 2:
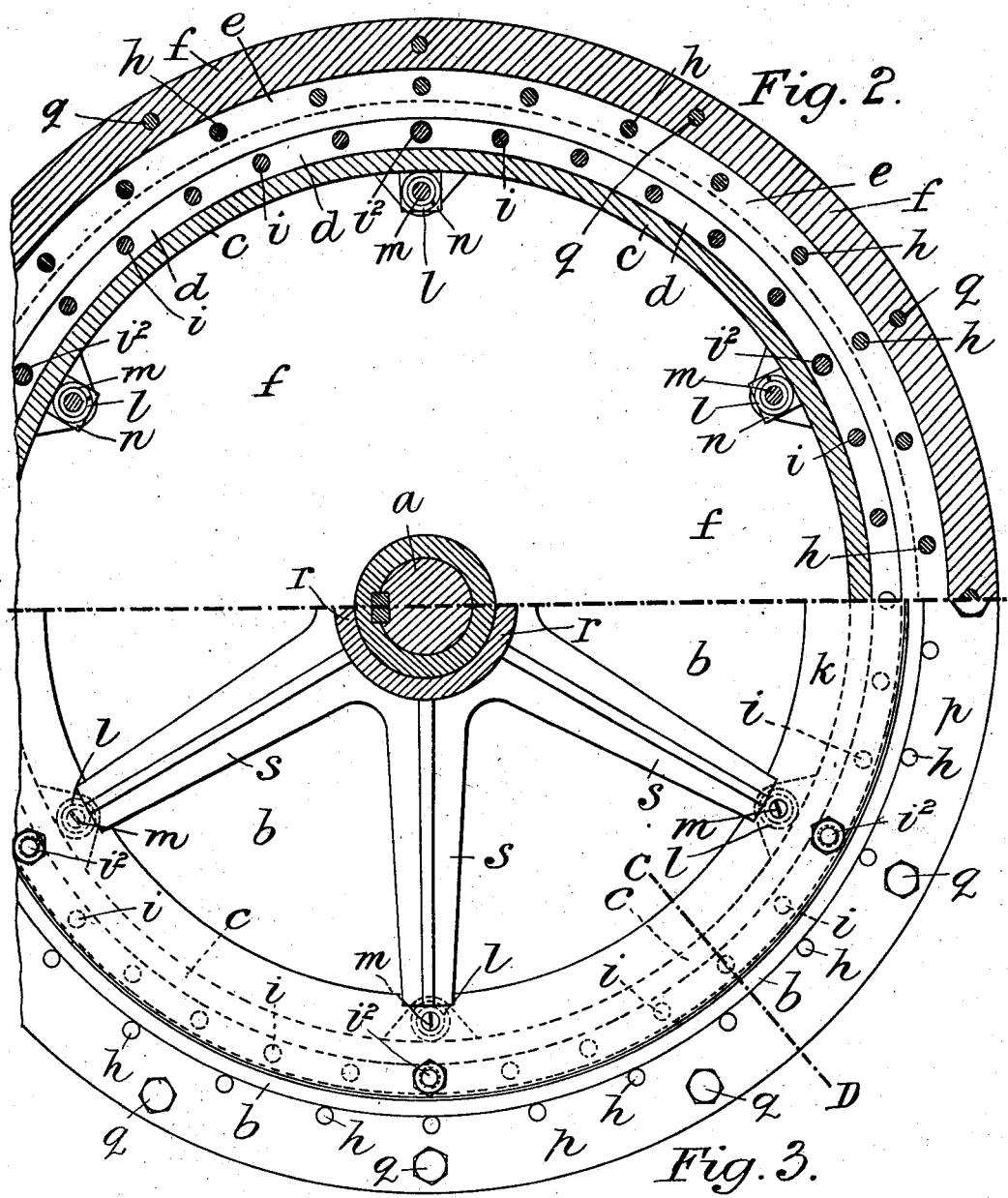
Figure 3:
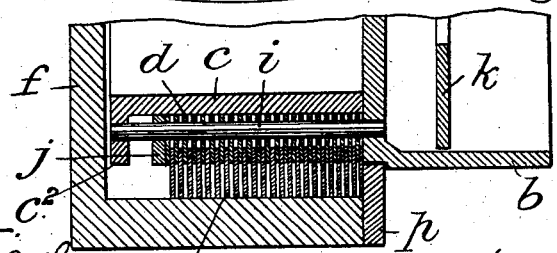

Figure 1 is a longitudinal section; and Fig. 2 a face view, partly in section, on the line A B of Fig. 1. Fig. 3 is a part section on the line C D, Fig. 2. Fig. 4 is an enlarged detail showing more clearly the way the rings are mounted so that end thrust between the driving and driven parts is avoided.

$a$ is the shaft to be driven, having keyed to it the wheel $b$, secured to the back of which is the drum $c$, around the periphery of which are mounted on rods $i$ (see Fig. 3) the thin steel rings $d$, the outward portions of which are situated between other thin steel rings $e$, carried by pins $h$, secured to the fly-wheel $f$, secured to the motor-shaft $g$, and surrounded by a deep rim or flange $f^2$ on the said fly-wheel and extending around the drum $c$ at a sufficient distance therefrom to accommodate the rings $d$ and $e$, so that the edges of the rings $e$ do not actually come in contact with the rim or flange $f^2$ of the fly-wheel $f$ and the edges of the rings $d$ do not come in contact with the periphery of the drum $c$, as seen more clearly at $e^2$ and $d^2$, respectively, in Fig. 4. Moreover, it will be seen that the rings $e$ have no bearing on any part of or attached to the fly-wheel $f$ except the pins $h$, so that there is no end thrust conveyed through the rings between the driving and driven parts. The rods $h$, upon which the rings $e$ slide, are carried at one end in recesses in the plate of the fly-wheel $f$ and at the other end in a ring $p$, secured by screws $q$ to the rim or flange $f^2$ of the fly-wheel $f$. The rods $i$, upon which the rings $d$ slide, are fastened at one end to the wheel $b$ and at the other end to the flange $c^2$ on the drum $c$. The rods $i$ constitute the means by which when the rings $e$ and $d$ are pressed together the driving motion is conveyed from the rings $e$ and $d$ to the wheel $b$ and thence to the shaft $a$. At intervals in place of the rods $i$ rods $i^2$ of smaller diameter are employed, these being secured at one end to a ring $j$, capable of sliding on the periphery $c^2$ of the drum $c$, and at the other end the said rods $i^2$ pass through holes in the wheel $b$ and are fastened to a ring $k$, upon which press springs $l$, carried upon rods $m$, passing through holes in the wheel $b$ and in the ring $k$, the other ends of the said rods $m$ being supported in recesses in the back of the drum $c$. Nuts $n$, capable of being adjusted on screws on the rods $m$, form abutments for one end of the springs $l$, the other ends of the said springs $l$ bearing upon the ring $k$, so that the said springs $l$, through the ring $k$, rods $i^2$, and ring $j$, cause the rings $d$ to pinch between them the rings $e$, which rings $e$ therefore carry around the said rings $d$, the motion being conveyed through the rods $i$ to the wheel $b$, and so to the shaft $a$, and therefore the shaft $g$ normally drives the shaft $a$. By reference to Fig. 4 it will be seen that the arrangement is such that the end thrust due to the pressure of the springs $l$ is confined to the driven parts and is not communicated to the driving parts, as the rings $e$ slide in either direction on the rods $h$ without coming in contact with the fly-wheel $f$ or its ring $p$. The tension of the springs $l$ can be adjusted by rotating the rods $m$, (for which purpose they are shown with nicked heads,) the nuts $n$ traveling on the said rods because the said nuts are prevented from rotating by bearing against the inside of the drum $c$.

Mounted loosely on the sleeve or boss carrying the wheel $b$ is a boss $r$, with arms $s$, which bear on the ring $k$. The said boss $r$ is provided with means, such as an ordinary clutch-shifter, by which it can be moved longitudinally on the sleeve or boss of the wheel $b$. When the said boss $r$ is moved in the direction of the arrow, the arms $s$ move the ring $k$, rods $i^2$, and ring $j$ in the said direction, so that the rings $d$ and $e$ are released from their frictional contact with each other, and the parts connected with the shaft $g$ rotate without conveying motion to the shaft $a$. When the boss $r$ and arms $s$ are moved in the other direction, the springs $l$ again exert their force to cause the frictional contact between the rings $d$ and $e$ to convey motion from the shaft $g$ to the shaft $a$.

Clutches in which disks are used and which are thrown into and out of action by sliding a part of the clutch through which driving strain is transmitted are not sufficiently sensitive for some purposes—such as motor-car driving, for example—but in a clutch made in accordance with our invention, as hereinbefore described and illustrated, the parts which operate the clutch carry none of the driving strain, but are only subjected to the light strain required to operate the clutch and can be moved with perfect ease at all times, and the arrangement is such that no end thrust is transmitted to either the driving or driven parts. The mode of carrying the rings $d$ and $e$ on rods allows them to be acted upon very easily and in true line, while as the rings are carried by parts of large diameter the said rings are of a corresponding large diameter and give a large bearing-surface upon each other, thus increasing the power of the clutch.

Having now particularly described and ascertained the nature of our said invention and in what manner the same is to be performed, we declare that what we claim is—

1. In a clutch, two sets of rings alternating with and partly overlapping each other, one set being carried by rods having bearings at both ends arranged around a part of large diameter on the driving part, and the other set being carried by rods having bearings at both ends arranged around a part also of large diameter on the driven part, in combination with means for pressing the rings of the two sets together, and means for releasing them, the said means being independent of the driving parts in the sense that they carry none of the driving strain and the rings on the driving part being arranged so that they come in contact with no part of, or connected to, the part of large diameter which carries them (except the said rods) substantially as hereinbefore described.

2. In a clutch, a set of rings carried by rods arranged around a part of large diameter on the driving part, these rings having bearing upon no part of, or connected with the said part of large diameter (except the said rods) and alternating with, and partly overlapping, the rings of a set carried by rods arranged around a part also of large diameter on the driven part, in combination with springs, pressing the rings of the two sets into contact, and a device for relieving the said rings from the pressure of the springs, the said device consisting of a clutch-shifter and a part capable of being moved thereby longitudinally on the boss, or sleeve, of a wheel which carries the rods supporting the inner set of rings, the said part being provided with arms bearing on a ring to which are connected rods passing through the inner set of rings and connected to another ring which bears on the rearward ring of the said inner set and under the pressure of the springs presses the rings of the two sets together to apply the clutch, the said device being independent of the driving parts in the sense that it carries none of the driving strain, substantially as hereinbefore described.

In testimony whereof we affix our signatures in presence of two witnesses.

EDWARD FRANKLIN BRADLEY.
    WINTER RANDELL PIDGEON.

Witnesses to the signature of Edward Franklin Bradley:
  WILLIAM GERALD REYNOLDS,
  WILLIAM JOHN WEEKS.

Witnesses to the signature of Winter Randell Pidgeon:
  A. GAILLARD,
  EUGÉNE HÜBSCHER.